Nov. 14, 1967  J. A. BRINK, JR., ET AL  3,352,778
SHAPED FIBERS

Filed Aug. 17, 1965  4 Sheets-Sheet 2

INVENTORS
WILLIAM W. SUGG
JOSEPH A. BRINK, JR.
BY *Richard H. Childress*

ATTORNEY

INVENTORS
WILLIAM W. SUGG
JOSEPH A. BRINK, JR.
BY
Richard H. Childress

ATTORNEY

Nov. 14, 1967

J. A. BRINK, JR., ET AL 3,352,778

SHAPED FIBERS

Filed Aug. 17, 1965

INVENTORS
WILLIAM W. SUGG
JOSEPH A. BRINK, JR.

BY *Richard H. Childress*

ATTORNEY 3,352,778
SHAPED FIBERS
Joseph A. Brink, Jr., Kirkwood, Mo., and William W. Sugg, O'Fallon, Ill., assignors to Monsanto Company, St. Louis, Mo., a corporation of Delaware
Filed Aug. 17, 1965, Ser. No. 480,365
12 Claims. (Cl. 210—23)

ABSTRACT OF THE DISCLOSURE

A shaped polymeric fiber is described containing a plurality of helical convolutions having a percent of convolution of at least about 100, a percent of elongation to break of at least about 25, and a cross-sectional area of from about 10 to about 1,000 square mils, as well as a filtering unit containing such fibers and the use of such fibers in processes for separating mists from mist laden gases and coalescing a fluid containing two immiscible liquids, and apparatuses for carrying out such processes.

---

This invention relates, in general, to shaped fibers, filtering units containing such fibers and uses for such filtering units including apparatuses containing such units.

Heretofore, in such areas as filtering by separating solids from gases or liquids, coalescing by resolving liquid-liquid emulsions or dispersions and eliminating mist by separating liquid mists from mist laden gases, it was generally understood that the separating medium or filtering aid used, particularly with respect to removing small particles from such mediums, operated more efficiently when the fiber used as the filtering aid is of a relatively small cross sectional area. However, such separating mediums or filtering aids have the serious limitation of tending to mat or collapse under normal operating conditions of flow of the aforesaid mediums through such with the result that pressure drops across the medium tend to become excessive and/or the efficiency of the separating medium or filter aid is lowered as well as the efficiency of the system. As can be appreciated, therefore, a pliable fiber of a relatively large cross sectional area and shaped to provide a high degree of resiliency, and which is capable of functioning as a filter aid or separating medium for small particles without appreciably matting or collapsing would represent an advancement in this art.

It is therefore, an object of this invention to provide a shaped fiber which can be used in filtering units as a filtering aid.

It is another object of this invention to provide a pliable fiber shaped to provide a high degree of resiliency which can be used in filtering units as a filtering aid.

It is a further object of this invention to provide filtering units useful as filtering aids containing pliable fibers shaped to provide a high degree of resiliency.

It is a still further object of this invention to provide processes for filtering or separating small particles contained in a moving or flowing medium using filtering units containing pliable fibers shaped to provide a high degree of resiliency.

It is a still further object of this invention to provide filtering apparatus utilizing filtering units containing pliable fibers shaped to provide a high degree of resiliency.

The above as well as other objects will become apparent from a reading of the following detailed description.

This invention, in general, is directed to novel shaped fibers, filtering units containing such fibers and uses for such filtering units including apparatuses containing such units, all of which will be more fully discussed hereinafter.

In general, the shaped fiber material of the present invention contains a plurality of helical convolutions having a percent of convolution of at least about 100, a percent of elongation to break of at least about 25, and a cross sectional area of from about 10 to about 1,000 square mils.

As used herein "percent of convolution" is defined by the formula:

(I)

$$\text{Percent of Convolution} = \frac{(\text{extended length minus helically convoluted length})}{(\text{helically convoluted length})} \times 100$$

By "extended length" is meant the shortest length to which the relaxed helically convoluted fiber must be elongated by tension to remove all helical convolutions and produce a temporarily completely straight fiber.

As used herein "percent of elongation to break" is defined by the formula:

(II)

$$\text{Percent of elongation to break} = \frac{(\text{extended length at break minus extended length})}{(\text{extended length})} \times 100$$

By "extended length at break" is meant that the shortest length to which the extended length fiber can be elongated by tension until parting of the fiber is achieved. "Extended length" as used in the above Formula II is the same as "extended length" defined hereinbefore.

With respect to the shaped fiber of the present invention, it has been found that in order to be used as an effective filter aid the fiber should have a degree of resiliency, pliability and strength to maintain and/or retain its shape while withstanding deforming forces, such as gas pressures, liquid pressures and the like, to which it is subjected as a filter aid without collapsing or matting to any appreciable degree. This entails a fiber which exhibits a percent of convolution of the order to form a spongy or springy resilient fiber bed, a pliable, ductile, or non-brittle nature which aids to the fiber in retaining its helically convoluted shape under such deforming forces and a cross sectional area of such dimension which imparts to the shaped fiber the necessary size and strength to act as a filter aid while maintaining its helically convoluted shape under such deforming forces.

In view of the foregoing, the fiber of the present invention preferably has a percent of convolution of from about 100 to about 2500, especially preferred from about 400 to about 1500, although in some cases percentages greater than 2500 can be used if the fiber has the necessary pliability and strength to maintain its helically convoluted shape. Additionally, the fiber of the present invention preferably has a percent of elongation to break of from about 25 to about 700, especially preferred from about 200 to about 500, although in some cases percentages greater than 700 can be used if the fiber has the necessary strength to maintain its helically convoluted shape. Still further, the fiber has a cross sectional area of from about 10 to about 1000 square mils, especially preferred from about 60 to about 200 square mils. Additionally, the fiber preferably has an essentially uniform cross section along its length. The cross sectional shape of the fiber can be any conventional shape such as circular, elliptical, rectangular, square and the like, although a rectangular cross sectional shape is preferred due to, among other things, the ability to achieve a high surface area per unit weight of the fiber while maintaining the strength and resiliency of the fiber, especially such shape having a thickness of from about 1 to about 10 mils, especially preferred from about 3 to about 5 mils, and a width of from about 10 to about 100 mils, especially preferred from about 20 to about 40 mils. The length of the fiber can, in general, be any length and especially any length greater than about 0.5 inch and such can be as long as 500 feet, 1,000 feet and even longer, if desired. The fiber bed can take the form of a plurality of such fibers, preferably randomly mixed or oriented, or in some cases, if desired, the fiber bed can consist essentially of one continuous strand of the shaped fiber.

In general, polymeric materials which can be used to form the anfractuous fiber of the present invention include any plastic material and, in particular, non-porous or relatively high density synthetic polymeric materials which include: fluorocarbon polymers (polytetrafluoroethylene and fluorinated ethylene propylene), polystyrene, polymono or di halostyrene, polyamides of the nylon type, polyacrylonitrile, polymethacrylonitrile, polyalkyl methacrylate, α-halo polyalkylacrylate, polyvinylidene chloride, polyvinylidene fluoride, polyvinyl chloride, polyvinyl fluoride, polyvinyl carbazole, polyvinyl alcohol, polymeric glycol phthalates (polyethylene terephthalate), cellulosics (cellulose acetate, cellulose propionate, cellulose acetate butyrate, cellulose nitrate, ethyl cellulose, etc.) polyethylene, polypropylene, polybutylene, polyisobutylene, polyvinyl butyral, polyvinyl acetate polyesters (dicarboxylic-glycol polymers), urethanes (polyisocyanate-polyether or polyester glycols) and the like. The selection of a particular fiber material to be used in any specific set of circumstances will depend upon factors such as cost, resistance to attack by particular chemical agents, the particular medium being processed, or other factors which are readily ascertainable by those skilled in the art.

The shaped fiber of the present invention may be formed by many and various ways depending upon the polymeric material used and the like which includes, for example, machine lathing a cylindrical stock of the desired polymeric material with the width of the fiber being the depth of the cut and the thickness of the fiber being controlled by the rate of travel of the cutting tool and rate of rotation of the stock or forming the fiber around a cylinder of the shape to give the desired degree of helical convolutions and heat treating the polymeric fiber to retain its shape.

As previously mentioned, the fiber units of the present invention can be used for many and various purposes which include filtering solids from gases or liquids such as, for example, a dust filter to remove dust particles from air or other gases, to protect storage tanks by preventing bacteria contamination from air or to remove toxic particles from air or other gases; coalescing by resolving liquid-liquid emulsions or dispersions such as, for example, water and gasoline or fuel oil, HF alkylation catalyst and alkylated liquor, sulfuric acid alkylation catalyst and alkylated liquor, alkylaryl sulfonic acids and sulfuric acid, mercury and caustic soda and the like; and mist elimination by separating liquid mists from mist laden gases, such as, for example, sulfuric acid mists, nitric acid mists, phosphoric acid mists, hydrogen fluoride mists, and fluosulfonic acid mists and the like from gases containing such mists. With respect to filtering solids from gases, such as dust filters, the fibers can be coated, if desired with an adhesive substance such as glycol, tricresylphosphate, petroleum and the like as is well understood in this art. The foregoing areas of utilization are by no means the extent of use to which the fiber units of the present invention can be used and the invention is not intended to be limited thereto.

The fiber bed of the present invention for use as a filtering unit should be compressed such that it has a packing density which permits the flow therethrough of the medium to be filtered without an excessive or undesirable pressure drop across the bed or without collapsing, matting or clogging of the bed. In general, the packing density will vary depending upon, inter alia, such factors as the type of polymeric fiber used, type of medium to be filtered, velocity of such medium through the bed and the like. Additionally, the fibers having the smaller cross section area will generally require higher packing densities than the fibers having larger cross section areas.

Since the true densities of fibers vary from material to material "percent of voidage" is used herein in order to present a better understanding of the degree of packing which is necessary for the fiber bed to function as a filtering unit.

As used herein "percent of voidage" is defined by the formula:

(III) Percent of Voidage =

$$\frac{(\text{true density minus packing density})}{(\text{true density})} \times 100$$

From the percent of voidage and knowing the true density of the polymeric material used as the fiber bed, the packing density can be readily calculated. Usually, an effective percent of voidage of the fiber bed of the present invention ranges from about 55% to about 80%, with from about 70% to about 76% being preferred. In particular, an effective packing density of the fiber bed made from polytetrafluoroethylene ranges from about 30 to about 60 pounds per cubic foot with packing densities from about 35 to 45 pounds per cubic foot being preferred.

The fiber bed can be compressed readily to form the desired packing density by applying a compressive force against the bed in one direction while confining the bed to a constant cross sectional area normal to the direction of applied compressive force. The magnitude of force required will vary, depending upon, inter alia, the particular fiber selected as well as the size of the bed being compressed. For example, to pack a bed of polytetrafluoroethylene fiber to a packing density of about 40 pounds per cubic foot will require a pressure to be applied to the bed of about 30 to 50 pounds per square inch of the bulk fiber.

In general, the bed depth of the fiber bed of the present invention for use as a filtering unit can vary depending upon, inter alia, such factors as the type of medium to be filtered, velocity of such medium through the bed and the like. Usually an effective bed depth which ranges from about 0.25 inch to about 12 inches and preferably from about 0.5 inch to about 6 inches, is sufficient for most applications. Such a bed depth exhibits a normal pressure drop across the bed, that is, a pressure drop below about 56 inches of water.

As previously mentioned, the fiber units of the present invention can be used for coalescing or demulsifying many and various liquid-liquid emulsions or dispersions. In particular, the fiber units are effective in resolving liquid-liquid emulsions or dispersions in systems having, relatively speaking, low to normal flow rates, that is, flow rates up to about 10 gallons per minute per square foot of fiber bed, with flow rates below about 4 gallons per minute being preferred.

As previously mentioned, the fiber units of the present invention can be used for the elimination of many and various types of liquid mists from mist laden gases. In particular, the fiber units are effective in eliminating liquid mists from mist laden gases in systems utilizing, relatively speaking, high gas flow rates, that is, greater than about 200 cubic feet per minute per square foot of fiber bed with high velocity gas flow rates of from about 300 to about 600 cubic feet per minute per square foot of fiber bed being preferred.

With respect to the foregoing, the following are set forth as some of the features and advantages to be derived from using a fiber bed of the present invention as a filtering unit:

(1) Due to the nature of the fiber bed, such can be comprised of relatively large fibers, yet can remove relatively small particles, which is completely unexpected.

(2) The fiber bed exhibits a resiliency which minimizes the tendency toward matting or collapsing.

(3) The fiber bed exhibits a size, shape and pliability which minimizes the tendency toward channeling, that is, forming objectionable localized passages through the bed, and thus decreasing its filtering efficiency.

(4) The fiber bed can be readily cleaned and thus re-used.

(5) The fiber bed can be comprised of non-wettable or hydrophobic fibers, such as, polytetrafluoroethylene, and still effectively function in passing liquid mediums.

(6) As compared to a fiber bed of the same material, but of finer cross sectional area, the fiber bed can function with much lower pressure drops across the bed. Stated differently, the fiber bed permits greater throughputs, that is, higher flow-rates, at reasonable pressure drops as compared to beds of finer diameter fibers of the same fiber material.

In order to facilitate the description and understanding of this invention, reference is made to the appended drawings in which.

Figure 1:
FIGURE 1 is a photograph of a shaped fiber bed of the present invention.
Figure 2:
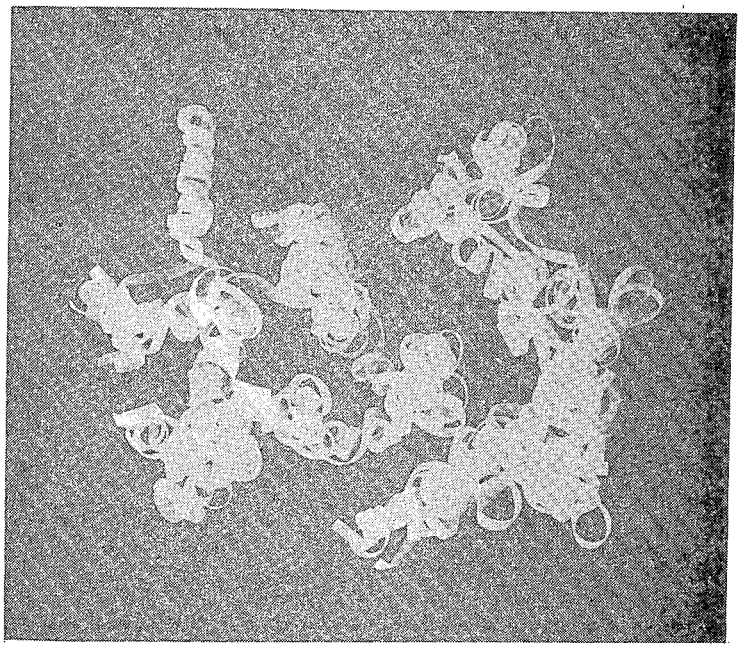
FIGURE 2 is a photograph of a shaped fiber of the present invention in essentially one continuous strand and magnified about 3 times.

Referring to FIGURES 1 and 2, it can be seen that the shaped fiber of the present invention has a lofted or bulky appearance with the fiber being curled into an interlaced resilient, spongy fiber bed.

Figure 3:
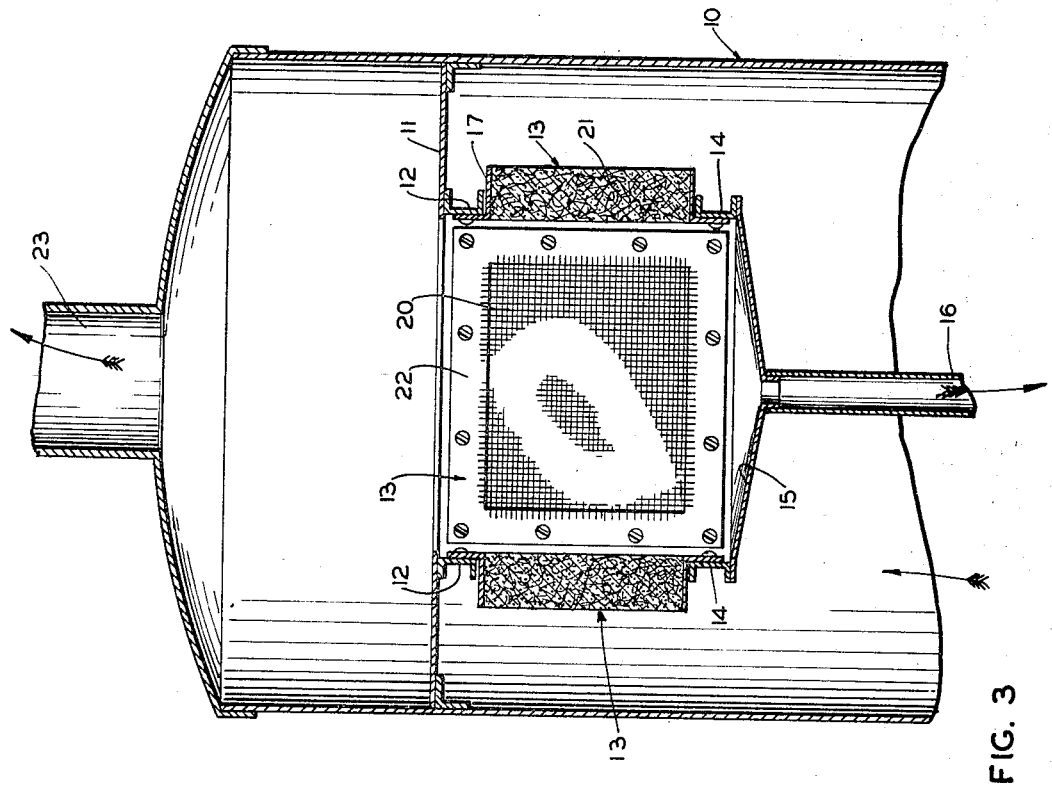
FIGURE 3 is a cross sectional view of the upper portion of an acid adsorption tower, such as a sulfuric acid absorption tower, in which is installed a plurality of fiber mist eliminator units of the present invention for the removal of acid mist from the gases from the acid absorber which are to be passed to a stack.

With particular reference to FIGURE 3 of the drawings there is illustrated the upper portion of the outer shell of an acid absorption tower 10, such as a sulfuric acid absorption tower, in which the vapors of sulfur trioxide are absorbed in a sulfuric acid medium of the desired concentration in a manner well known in the art. As is also well known in the art, this reaction creates sulfuric acid mist in which very fine droplets of the acid are suspended in the effluent gases from the absorber. An exhaust means 23 is provided for removing the gases from the tower.

Secured by any suitable means such as welding to the inner walls of absorption tower 10 are support plates 11 provided with depending flange elements 12. The support plates 11 are positioned around the inner walls of the adsorption tower 10 to provide a square or rectangular opening, as desired, to allow passage of gases through the tower. To each depending flange element 12 is secured by any suitable means such as bolts a mist eliminator unit 13 such that within the tower there is provided a square or rectangular bank of vertically aligned mist eliminator units through which the ascending gases and vapors must pass. Immediately positioned below each mist eliminator unit 13 and secured thereto by any suitable means such as bolts is a base plate 14 to which is affixed a baffle plate 15 which directs the flow of liquid from the mist eliminator unit 13 to a centrally positioned conduit 16 for passage out of the upper portion of the absorption tower 10.

Figure 4:
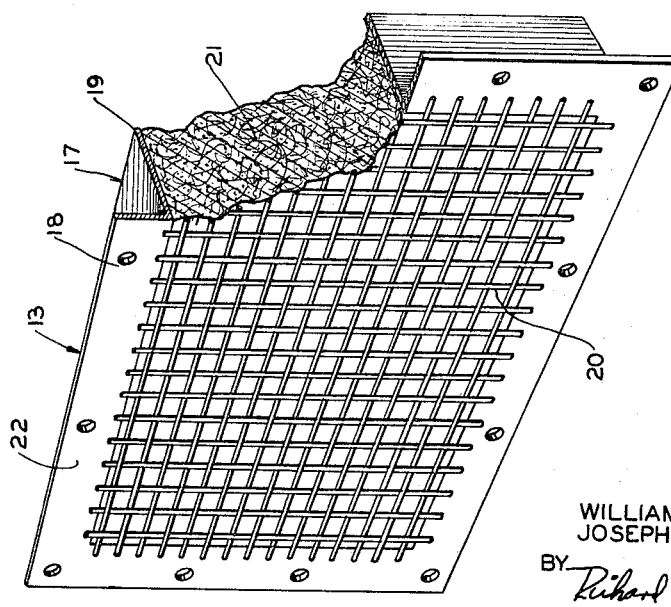
FIGURE 4 is an enlarged cross-sectional view of one of the fiber mist eliminator units employed in the apparatus of FIGURE 3.

With particular reference to FIGURE 4 of the drawings, the mist eliminator unit 13 in each instance is provided with a rectangular or square shaped casing or housing 17, as desired, of thickness which corresponds to the desired bed thickness of the fiber bed 21. The front and back covers, 18 and 19, respectively, of the casing 17 are provided with screens 20 (shown only for front cover 18) which act as retainers for the fiber bed 21. The front cover is provided with an extending flange element 22 around the perimeter thereof which is used for securing the mist eliminator unit 13 in the absorption tower 10 as hereinbefore described.

In operation mist laden gases created in the absorption tower 10 pass upwardly and laterally through the mist eliminator unit 13 which results in the mist in the gases being collected upon the surfaces of the fiber in bed 21. The cleaned gas then flows upwardly through the opening formed by the support plates 11 and passes out through the exhaust 23 of the absorption tower 10. The liquid collected upon the fibers of the mist eliminator unit drains from the bed by gravity flow, is directed by baffle plate 15 into conduit 16 and passes through conduit 16 as a liquid phase in substantially undiluted form. In other words the liquid in the conduit during operation is recovered acid which would otherwise be wasted and from the conduit the recovered acid can be returned, if desired, to the lower portion of the absorption tower or passed out of the absorption tower.

Figure 5:
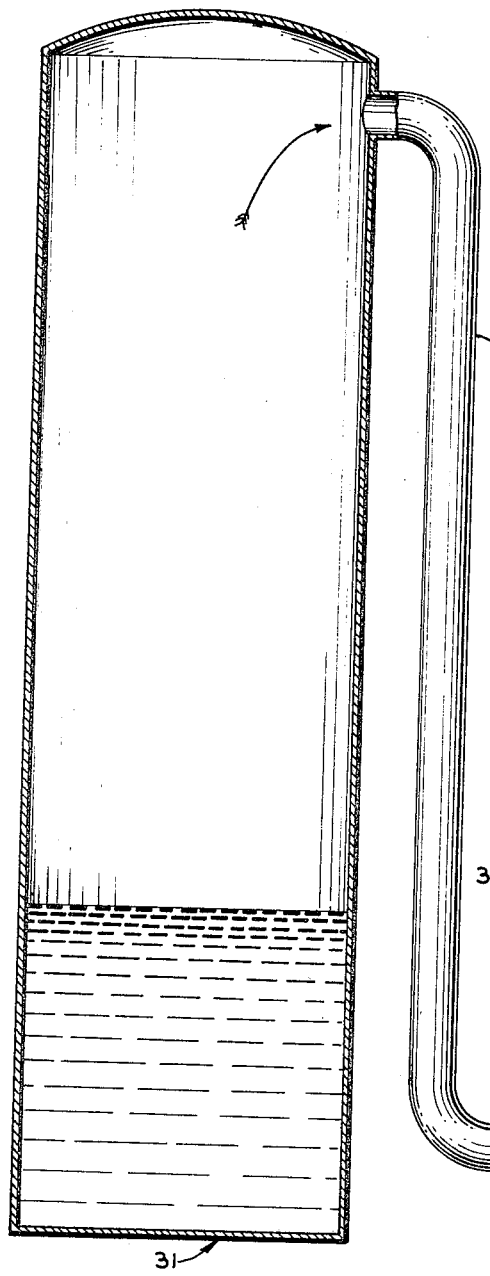
FIGURE 5 is a modified form of the apparatus of FIGURE 3 but in which the mist eliminator units are separated from the acid absorption tower.
Figure 5:
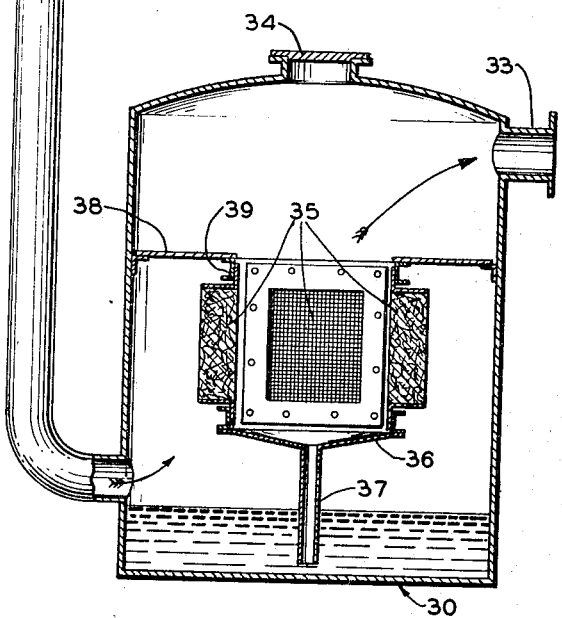

With reference to FIGURE 5 of the drawings there is illustrated a modification of an apparatus as previously described which is particularly useful in connection with acid plants already in existence. In accordance with the modification a tank member 30 is positioned adjacent to a standard acid absorption tower 31 and is operatively connected thereto by means of conduit 32 which brings mist laden gases from the upper end of the absorption tower 31 to the lower portion of tank 30. Tank 30 is provided with an outlet means 33 generally similar to the outlet means 23 of FIGURE 3 and a manhole cover 34 which provides access to the interior of the tank.

Secured to the to the inside wall of tank 30 are laterally extending plates 38 with depending flanges 39 which generally correspond to the plates 11 and flanges 12 of the apparatus previously described. A plurality of mist eliminator units 35, generally similar to the units 13 previously described in FIGURE 3, are mounted to the flanges 39 and serve in the manner previously described for removing mist passing through the mist eliminator units 13 by way of baffle plates 36 to conduit 37.

In operation mist laden gases from the absorption tower 31 are passed to tank 30 by means of conduit 32 and are thereafter passed through the mist eliminator units 35 in tank 30 and out exhaust means 33. The mist contained in the gases as they pass through the units 35 is thereby recovered in the manner previously described and drains into the bottom of tank 30. The recovered acid can then be used or can be returned to the process by way of the lower portion of the absorption tower.

Figure 6:
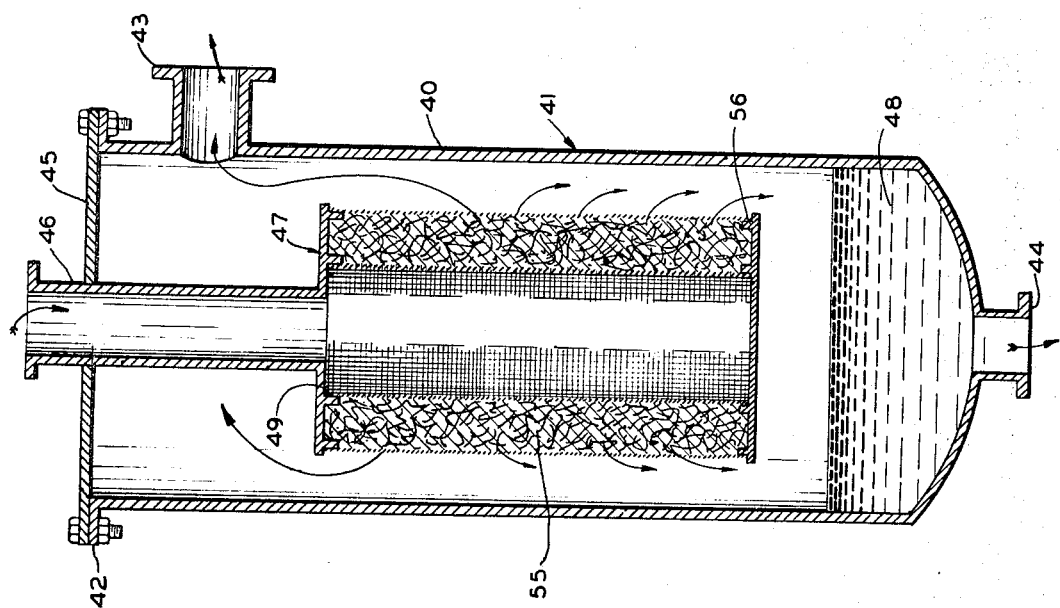
FIGURE 6 is a cross sectional view of an apparatus for coalescing or demulsifying two immiscible fluids in which is installed a coalescer unit of the present invention.

With particular reference to FIGURE 6 of the drawings there is illustrated an apparatus for coalescing or demulsifying two immiscible fluids, such as a dispersion of HF alkylation catalyst in an alkylated liquor. As is well known in the art, in demulsifying two fluids the dispersed phase is caused to coalesce into droplets of such size that any difference in the specific gravity between the two phases, that is, the dispersed phase and the continuous phase, will result in the separation of the phases into two separate layers which can be readily separated.

The housing or casing 40 of the demulsifying apparatus 41 is provided with an opening having an annular flange element 42, an outlet passage 43 for the continuous phase fluid, and an outlet passage 44 for the dispersed phase fluid. A top cover 45 provided with a centrally disposed opening for receiving the inlet conduit 46 is secured to the annular flange element 42 of the housing by any suitable means such as bolts. The inlet conduit 46, such as a circular pipe, extends generally from through the opening in the top cover 45 into the housing and is secured to the coalescing or demulsifying unit 47 of the present invention. The inlet conduit 46 provides an inlet passage for the two immiscible fluids into the demulsifying unit 47. The lower portion of the casing forms a chamber 48 for receiving the coalesced droplets of the dispersed phase fluid as the droplets settle downwardly from the demulsifying unit 47.

Figure 7:
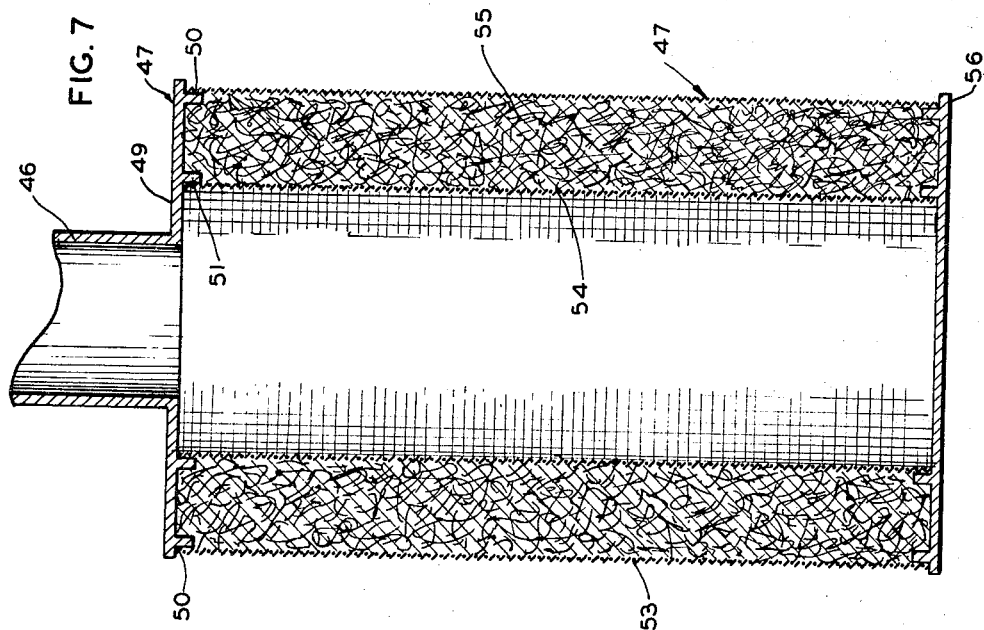
FIGURE 7 is an enlarged cross sectional view of the coalescer unit employed in the apparatus of FIGURE 6.

With respect to FIGURE 7 and the demulsifying unit 47, this unit is provided with an annular support plate 49 having an opening for receiving the conduit 46. Depending from the under side of annular support plate 49 are two concentric protrusions 50 and 51 which provide support means to which is affixed one end of each of two concentric screens 53 and 54, respectively. The screens 53 and 54 act as retainers for the fiber bed indicated by reference numeral 55. The lower ends of the screens are retained in position by a base plate 56 which can be secured to the screens in any suitable manner. Base plate 56 also serves as a retaining member for bed 55 so that the fibers do not fall from the bed due to the force of gravity.

In operation, the two immiscible fluids flow into the apparatus through inlet conduit 46 and through the demulsifying unit 47 where the dispersed phase is caused to coalesce into relatively large droplets. When these droplets reach the external or outside portion of the demulsifying unit, most of the droplets are of sufficient size to overcome the velocity effect of the continuous phase fluid and settle downwardly into chamber 48 where they form a separate layer of the dispersed phase which is withdrawn through outlet 44 when a pre-determined level of said layer is reached. Some of the droplets may coalesce within the demulsifying element and by gravity tend to settle to the lower portion of the element and thus tend to establish flow of the dispersed phase fluid droplets over the top of the base plate and thence into chamber 48 to become part of the separate layer of the dispersed phase in the chamber. The continuous phase fluid passes outwardly and in some cases upwardly from the demulsifying unit 47 and flows from the apparatus through outlet 43.

The foregoing with respect to the coalescing apparatus has been described with respect to two immiscible fluids in which the dispersed phase fluid has a higher specific gravity than the continuous phase fluid. However, the apparatus can be operated with a liquid medium containing two immiscible fluids in which the dispersed phase has a lower specific gravity than the continuous phase.

It should further be noted that variations or modifications to the foregoing described coalescing apparatus and process can be used which include horizontal flow of the liquid medium through the apparatus and/or utilizing an apparatus with only one outlet passage and passing the resolved dispersion through this outlet passage and into a settling tank for separation as is well understood in this art.

The following examples are presented for the purpose of illustrating the invention and are not intended to be limitative on the scope of the invention.

EXAMPLE I

The process gases to a scrubber in a phosphoric acid plant were found to contain about 17 milligrams of acid mist having particle sizes greater than 3 microns and about 23 milligrams of acid mist having particle sizes smaller than 3 microns per standard cubic foot of gas. These process gases were passed through a bed of polytetrafluoroethylene shaped fibers of the present invention having a percent of convolution in the range of from about 600 to about 800, a percent of elongation to break in the range of from about 100 to about 300, a width of about 30 mils, thickness of about 4 mils and in strands each about 200–400 feet in length. The fiber bed had a bed thickness of about ½ inch and a packing density of about 40 pounds per cubic foot. The process gas velocity through the bed was about 319 feet per minute and the pressure drop across the bed was about 11 inches of water. After operation for about 2 days, in which time steady state condition has been achieved, the exiting process gases from the bed were found to contain about 0.0694 milligram of acid mist having particle sizes greater than 3 microns and about 1.164 milligrams of acid mist having particle sizes smaller than 3 microns per standard cubic foot of gas. This represents an average collection efficiency on particles of mist greater than 3 microns of about 99.5% and on particles of mist smaller than 3 microns of about 93.3%.

EXAMPLE II

Process gases to a scrubber in a phosphoric acid plant were passed through a bed of polytetrafluoroethylene shaped fibers under conditions substantially the same as described in Example I, except that the process gases were found to contain about 56 milligrams of acid mist having particle sizes greater than 3 microns and about 12 milligrams of acid mist having particle sizes smaller than 3 microns per standard cubic foot of gas. Additionally, the process gas velocity through the bed was about 389 feet per minute and the pressure drop across the bed was about 8.2 inches of water. After operation for about 60 days, in which time steady state conditions had been achieved, the exiting process gases from the bed were found to contain about .271 milligram of acid mist having particle sizes greater than 3 microns and about 2.12 milligrams of acid mist having particle sizes smaller than 3 microns per standard cubic foot of gas. This represents an average collection efficiency of particles of mist greater than 3 microns of about 99.3% and on particles of mist smaller than 3 microns of about 83%.

EXAMPLE III

The alkylated liquor and HF catalyst mixture containing about 15% by weight of HF from an alkylation reactor wherein olefins having an average chain length of about 12 to 14 carbon atoms were alkylated with benzene using HF as the catalyst were passed through a bed of polytetrafluoroethylene shaped fibers of the present invention having a percent of convolution in the range of from about 600 to about 800, a percent of elongation to break in the range of from about 100 to about 300, a width of about 30 mils, thickness of about 4 mils, and in strands each about 100–300 feet in length. The coalescer fiber bed had a bed thickness of about 6 inches and a bed density of about 34 pounds per cubic foot. The alkylated liquor and HF superficial velocity through the bed was about 0.5 foot per minute. After operation for about 16 hours, in which time steady state conditions had been achieved, the percent HF in the alkylated liquor and percent alkylated liquor in the HF catalyst was found to be about 0.4 and 0.0, respectively, after the alkylated liquor and HF were allowed to separate in a settler. When such system was run without the coalescer bed about 2.2% of HF in the alkylated liquor and about 2.0% of alkylated liquor in the HF was found.

The foregoing, using the coalescing unit of the present invention, represents an improvement of about 82% for the HF in the alkylated liquor and about 100% for the alkylated liquor in the HF catalyst phase as compared to normal separation of the HF and alkylated liquor.

EXAMPLE IV

Under conditions substantially the same as described in the foregoing Example III, except that the coalescer fiber bed had a bed thickness of about 9 inches and the unit was operated for about 27 hours, an alkylated liquor and HF catalyst mixture were allowed to separate in a settler. The percent HF in the alkylated liquor was found to be about 0.5 and the percent alkylated liquor in the HF was found to be about 0.5. When such system was run without the coalescer bed about 2.2% of HF in the alkylated liquor and about 2.0% of alkylated liquor in the HF was found.

The foregoing, using the coalescing unit of the present invention, represents an improvement of about 77% for the HF in the alkylated liquor and about 75% for the alkylated liquor in the HF catalyst phase as compared to normal separation of the HF and alkylated liquor.

EXAMPLE V

Under conditions substantially the same as described in the foregoing Example III, except that the alkylated liquor and HF mixture superficial velocity was about 1.0 foot per minute and the unit was operated for about 54 hours, an alkylated liquor and HF mixture were allowed to separate in a settler. The percent HF in the alkylated liquor was found to be about 0.8 and the percent alkylated liquor in the HF was found to be about 0.7.

What is claimed is:

1. A shaped polymeric fiber containing a plurality of helical convolutions and having a percent of convolution of at least about 100, a percent of elongation to break of at least about 25, an essentially rectangular cross section along its length with a width of from about 10 to about 100 mils and a thickness of from about 1 to about 10 mils, and a cross sectional area of from about 10 to about 1,000 square mils.

2. A shaped polymeric fiber according to claim 1 having a percent of convolution of from about 100 to about 2,500 and a percent of elongation to break of from about 400 to about 1,500.

3. The fiber of claim 2, where said fiber is comprised of polytetrafluoroethylene polymeric material.

4. A process for separating mists from mist laden gases which comprises passing said mist laden gases at flow rates greater than about 200 cubic feet per minute per square foot of fiber bed through a filter unit comprising a housing, a fiber bed containing helically convoluted polymeric fibers having a percent of convolution of at least about 100, a percent of elongation to break of at least about 25, an essentially rectangular cross section along their length with a width of from about 10 to about 100 mils and a thickness of from about 1 to about 10 mils, and a cross sectional area of from about 10 to about 1,000 square mils, said fiber bed having a percent of voidage of from about 55 to about 80, and means for retaining said fiber bed in said housing; and removing collected mists from said filter unit.

5. The process of claim 4, wherein said fibers are comprised of polytetrafluoroethylene polymeric material.

6. A process for coalescing a fluid containing two immiscible liquids which comprises passing said fluid at flow rates up to about 10 gallons per minute per square foot of fiber bed through a filter unit comprising a housing, a fiber bed containing helically convoluted polymeric fibers having a percent of convolution of at least about 100, a percent of elongation to break of at least about 25, an essentially rectangular cross section along their length with a width of from about 10 to about 100 mils and a thickness of from about 1 to about 10 mils, and a cross sectional area of from about 10 to about 1,000 square mils, said fiber bed having a percent of voidage of from about 55 to about 80, and means for retaining said fiber bed in said housing; and separately removing said liquids from said filter unit.

7. The process of claim 6, wherein said fibers are comprised of polytetrafluoroethylene polymeric material.

8. In a filter unit comprising a housing, a fiber bed and means for retaining said fiber bed in said housing, the improvement comprising a fiber bed containing helically convoluted polymeric fibers having a percent of convolution of at least about 100, a percent of elongation to break of at least about 25, an essentially rectangular cross section along their length with a width of from about 10 to about 100 mils and a thickness of from about 1 to about 10 mils, and a cross sectional area of from about 10 to about 1,000 square mils, and said fiber bed having a percent of voidage of from about 55 to about 80.

9. A filter unit according to claim 8 and containing helically convoluted polymeric fibers having a percent of convolution of from about 100 to about 2,500 and a percent of elongation to break of from about 400 to about 1,500.

10. The filter unit of claim 9, wherein said fibers are comprised of polytetrafluoroethylene polymeric material.

11. In a separator apparatus comprising, in combination, an inlet means, a filter unit comprising a housing, a fiber bed and means for retaining said fiber bed in said housing, and separate outlet means, the improvement comprising a fiber bed containing helically convoluted polymeric fibers having a percent of convolution of at least about 100, a percent of elongation to break of at least about 25, an essentially rectangular cross section along their length with a width of from about 10 to about 100 mils and a thickness of from about 1 to about 10 mils, and a cross sectional area of from about 10 to about 1,000 square mils, said fiber bed having a percent of voidage of from about 55 to about 80.

12. The apparatus of claim 11, wherein said fibers are comprised of polytetrafluoroethylene polymeric material.

References Cited

UNITED STATES PATENTS

| | | | |
|---|---|---|---|
| 218,611 | 8/1879 | Wilkinson | 261—98 |
| 1,324,066 | 12/1919 | Radford | 161—173 |
| 2,612,966 | 10/1952 | Nicol | 210—500 X |
| 3,019,904 | 2/1962 | Stecher | 210—312 |
| 3,078,544 | 2/1963 | Shealy | 264—168 |
| 3,135,646 | 6/1964 | Hayden | 264—168 X |
| 3,148,101 | 9/1964 | Allman et al. | 156—167 |
| 3,197,946 | 8/1965 | Taylor | 55—528 X |
| 3,229,817 | 1/1966 | Pall | 210—130 |
| 3,246,639 | 4/1966 | Oliver | 123—119 |
| 3,259,479 | 7/1966 | Tiede | 264—168 X |

REUBEN FRIEDMAN, *Primary Examiner.*

J. L. DeCESARE, *Assistant Examiner.*